June 3, 1969 R. L. SMITH 3,447,599
HEAT EXCHANGE APPARATUS
Original Filed March 17, 1966 Sheet 1 of 3
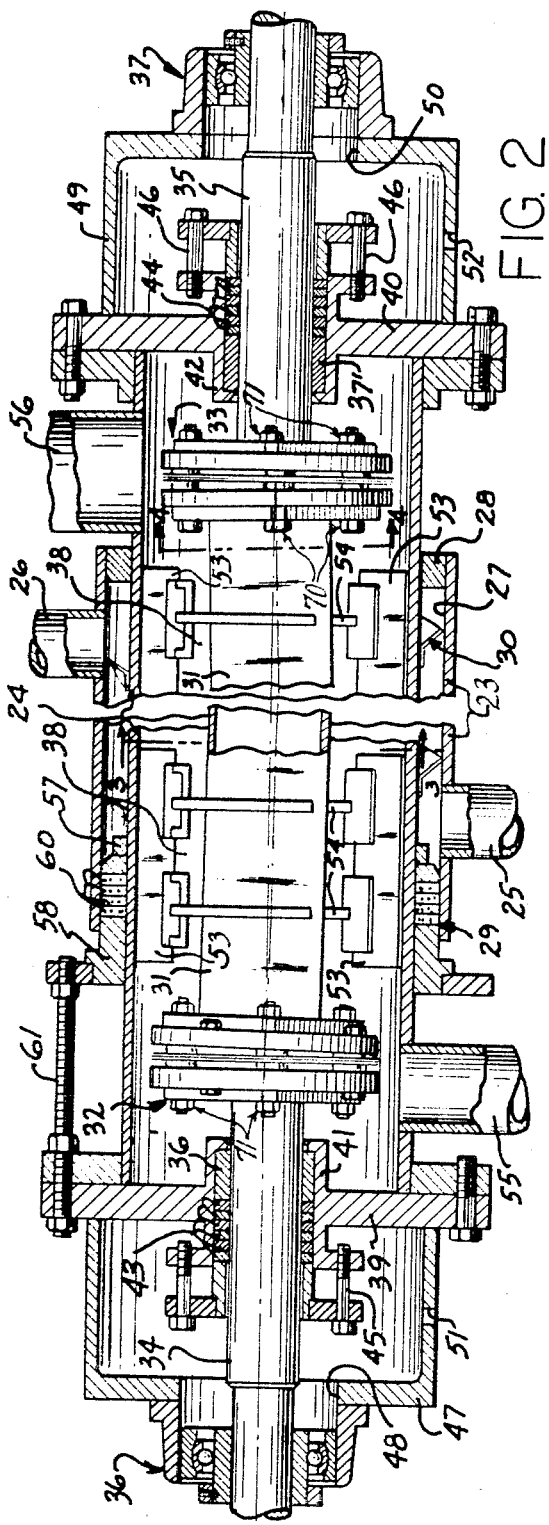
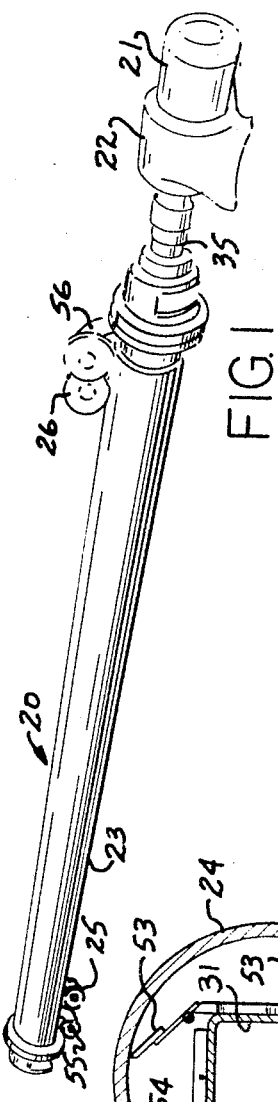
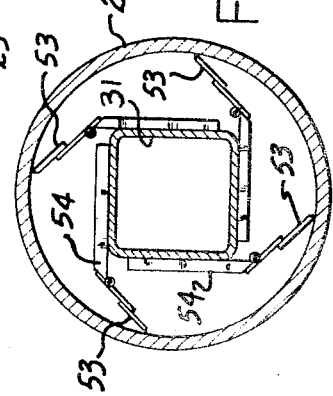
INVENTOR
ROBERT L. SMITH
BY
ATTORNEY

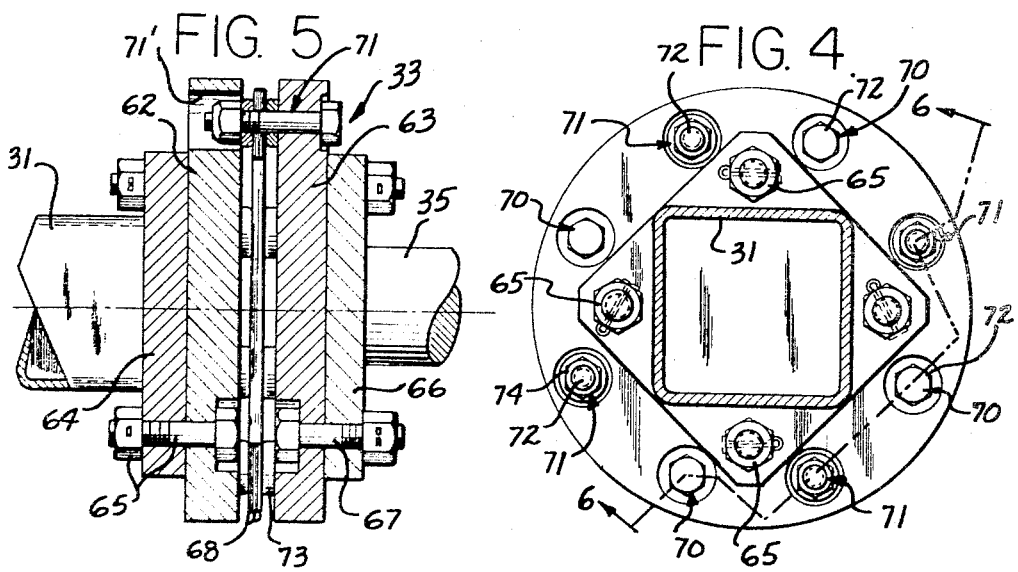
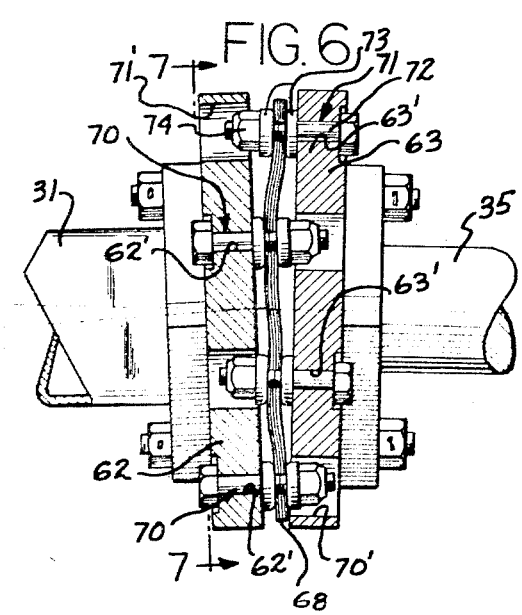
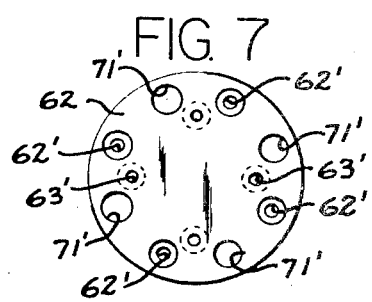
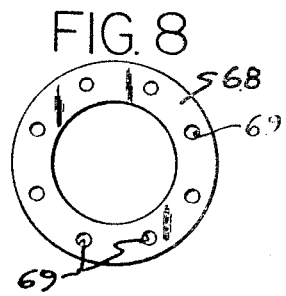

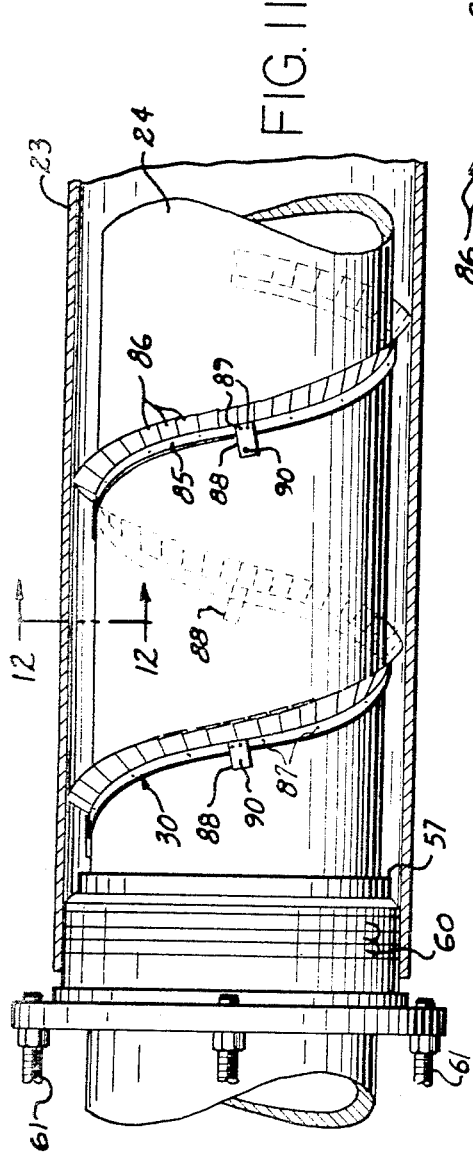
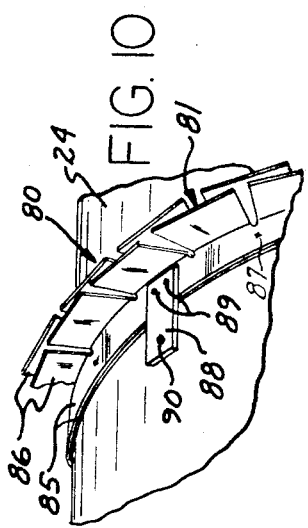
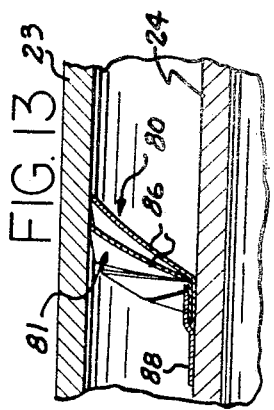
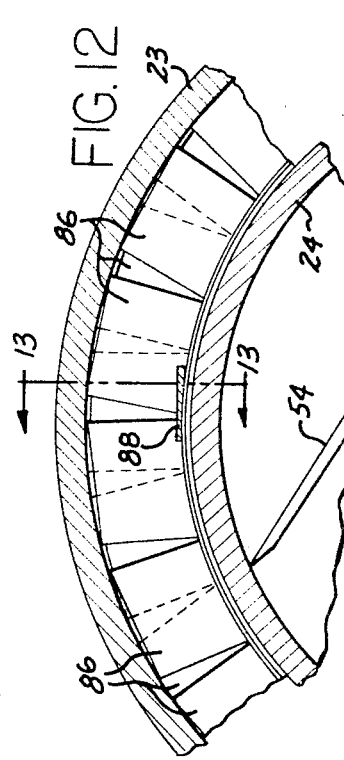
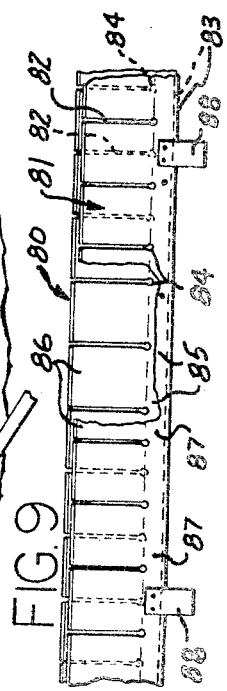

United States Patent Office 3,447,599
Patented June 3, 1969

3,447,599
HEAT EXCHANGE APPARATUS
Robert L. Smith, Louisville, Ky., assignor to Chemetron Corporation, Chicago, Ill., a corporation of Delaware
Original application Mar. 17, 1966, Ser. No. 535,090, now Patent No. 3,405,760, dated Oct. 15, 1968. Divided and this application Apr. 29, 1968, Ser. No. 738,755
Int. Cl. F28f 5/06, 1/42; B21d 53/02
U.S. Cl. 165—89                                    5 Claims

ABSTRACT OF THE DISCLOSURE

A baffle structure of paired strips having parallel cuts positioned between the shell and tube in a spiral affording a flow path for a heat exchange fluid.

---

This application is a division of application Ser. No. 535,090 filed Mar. 17, 1966, now Patent No. 3,405,760, granted Oct. 15, 1968.

This invention relates to heat exchange apparatus having a particular type baffle structure arranged between concentric members to define a fluid flow path.

Summary of the invention

The heat exchange apparatus comprises a generally cylindrical elongated tube, means for passing a heat exchange medium into heat exchange relationship with the tube, inlet and outlet means for introducing and discharging flowable materials from the tube, an elongated rotatable shaft disposed in the tube, mixing means carried by the shaft, and spaced apart means to mount the ends of the shaft for permitting flexure of the shaft, the shaft being unsupported between its ends. In particular, the flexure permitting mounting means includes a pair of axially aligned shaft sections and flexible joints connecting the shaft and the shaft sections.

The baffle structure of this invention is made by combining a pair of first and second strips, each strip having generally parallel cuts terminating short on one side edge to form a marginal flange portion and a series of baffle portions, the baffle portions being disposed obliquely with respect to respective marginal flange portions, placing the marginal flange portions of the first and second strips in face-to-face relationship with respect to each other and so that the baffle portions of the first strip lie alongside the baffle portions of the second strip, joining the first and second strips to each other, wrapping the joined first and second strips spirally about a heat exchange tube, securing the joined strips to the tube, and sliding the tube and the first and second strips into a tubular shell. In carrying out the method there are provided baffle means disposed in a generally spiral arrangement between the tube and a surrounding shell so that a flowable heat exchange medium can pass in a spiral path in heat exchange relationship in the tube. There are provided means for securing the first and second strips to each other, with the baffle portions of the first and second strips spanning the distance between the tube and the shell and lying alongside each other. More particularly, the baffle portions of the first strip are staggered in a spiral direction with respect to the baffle portions of the second strip, the first and second strips being formed of relatively thin resilient metal, with the baffle portions being sufficiently long and extending obliquely with respect to the tube and the shell to be flexed and urged into contact with both the tube and the shell.

In the drawings:

FIGURE 1 is a perspective view of heat exchange apparatus in accordance with the invention, together with drive means therefor;

FIGURE 2 is a broken away sectional view of the heat exchange apparatus shown in FIGURE 1;

FIGURE 3 is a sectional view taken along line 3—3 of FIGURE 2;

FIGURE 4 is a sectional view taken along line 4—4 of FIGURE 2;

FIGURE 5 is an enlarged sectional view showing a flexible coupling or joint and fragmentary portions of a shaft and a shaft section, also shown in FIGURES 2 and 4, with the shaft and shaft sections being joined axially aligned;

FIGURE 6 is a sectional view taken along line 6—6 of FIGURE 4, showing the shaft axis misaligned with respect to the associated shaft section, the misalignment being exaggerated for the sake of clarity;

FIGURE 7 is a view of one plate of the flexible joint taken along line 7—7 of FIGURE 6;

FIGURE 8 is an elevational view showing one of the rings also shown in FIGURES 2, 5 and 6;

FIGURE 9 is a fragmentary plan view of a pair of joined strips, before being wrapped about a heat exchange tube to form baffle structure;

FIGURE 10 is a fragmentary perspective view showing a portion of a heat exchange tube to which the baffle structure shown in FIGURE 9 is secured in a spiral arrangement;

FIGURE 11 is a sectional view showing the baffle structure secured to the heat exchange tube;

FIGURE 12 is a sectional view taken along line 12—12 of FIGURE 11; and

FIGURE 13 is a sectional view taken along line 13—13 of FIGURE 12.

In FIGURE 1 there is shown heat exchange apparatus generally indicated at 20, together with an electric drive motor 21 and a speed reducer 22. The heat exchange apparatus 20 has an elongated tubular shell 23 spaced about an elongated heat exchange tube 24. Inlet and outlet conduits 25 and 26 can introduce a flowable heat exchange medium into the space 27 between the shell 23 and the tube 24. The space 27 is closed off at one end by an annular spacer ring 28 and at its other end by seal structure generally indicated at 29. Baffle means 30, shown in greater detail in FIGURES 9 through 13 and described hereinafter, causes the heat exchange medium to pass in a spiral path in the space 27.

A shaft 31 is shown to be disposed in the tube 24. Although the shaft 31 is shown to be tubular in section to reduce its cost and weight, it can be solid if desired. The ends of the shaft 31 are connected to flexible couplings or joints generally indicated at 32 and 33. The flexible joint 32 is connected to a shaft section 34 and the flexible joint 33 is connected to a shaft section 35. Shaft sections 34 and 35 are rotatable in respective bearings generally indicated at 36 and 36' and 37 and 37'. The shaft sections 34 and 35 and respective bearings 36 and 36' and 37 and 37' and flexible joints 32 and 33 rotatably mount the shaft 31 at its ends.

Mixing space 38 defined by the tube 24 is closed off by plates 39 and 40 having respective, generally axially aligned, tubular central sections 41 and 42. Individual seal elements 43 and 44 and bearings 36' and 37' are disposed between the central section 41 and the shaft section 34 and between the central portion 42 and the shaft section 35. The pressure which the seals 43 and 44 exert against the shaft sections 34 and 35 can be increased or decreased by tightening or loosening spaced apart respective threaded fasteners 45 and 46. A cup-shaped section 47 secured to the plate 39 has a central bore 48 through which the shaft section 34 extends, and, a cup-shaped section 49 secured to the plate 40 has a central bore 50 through which the shaft section 35 extends. The bearings 36 and 37 are secured to respective sections 47 and 49.

The bottoms of sections 47 and 49 have respective outlet ports 51 and 52. Should any lubricant from the bearings 36 and/or 37 find its way into the sections 47 and/or 49 it will gravitate to the bottom of respective sections 47 and/or 49 and pass out of the ports 51 and 52. In like manner, should any material from within the space 38 leak past the seal elements 43 or 44, the leaked material will gravitate to the bottoms of the respective sections 47 and/or 49 and pass out through respective ports 51 and/or 52. It is apparent that the bearings 36 and 37 are completely isolated from the mixing space 38.

As an alternative, bearings 36' and 37', disposed inwardly of respective seal elements 43 and 44 along respective shaft sections 43 and 44, can be omitted; and a rigidly mounted bearing (not shown) can be disposed about each of the respective shaft sections 34 and 35 outwardly of respective seal elements 43 and 44 and spaced apart from respective bearings 36 and 37.

Scraper blades 53 carried by the shaft 31, pivotally mounted by mounts indicated at 54, scrape the inner surface of the heat exchange tube 24. An inlet conduit 55 communicates with one end of the mixing space 38 and the outlet conduit 56 communicates with the other end of the mixing space 38.

An annular ring 57 is secured to the exterior of the tube 24. An annular ring 58 slidably received about the tube 24 for axial movement serves to compress individual seal elements 60 when spaced apart screws 61, only one of which is shown in FIG. 2, are tightened.

Referring particularly to FIGURES 4, 5 and 6 of the drawings, there is shown the flexible coupling or joint 33. As the flexible joints 32 and 33 are identical in construction, a detailed description of the flexible joint 32 is deemed unnecessary. The flexible joint 33 includes a pair of plates 62 and 63. The shaft 31 is suitably joined to a plate 64, as by welding and the plate 64 is rigidly secured to the plate 62 by means of spaced apart threaded fasteners 65. The shaft section 34 is suitably secured to a plate 66 which is rigidly connected to the plate 63 by spaced apart threaded fasteners 67. A plurality of thin resilient rings 68 composed for example of spring steel, one of which is shown in FIGURE 8, have spaced apart apertures 69. The apertures 69 of each ring 68 are aligned with the corresponding aperture 69 of the next adjacent ring 68, and the apertures 69 are aligned with bores 62' and 63' in the respective plates 62 and 63. Connectors 70 secure the rings 68 rigidly to the plate 62 at spaced apart locations, and connectors 71 secure the rings 68 rigidly to the plate 63 at spaced apart locations. The connectors 70 and 71 are identical to each other, each including a bolt 72, a pair of washers 73 which straddle the set of rings 68 between the plates 62 and 63, and a nut 74 threadably received by the machine screw 72. Connectors 70 and 71 extend freely into enlarged bores 70' and 71' in plates 63 and 62, respectively.

Flexible joints 32 and 33 permit the shaft 31 to be misaligned with the shaft section 35 because the portion of the set of rings 68 between next adjacent connectors 70 and 71 can flex as depicted in FIGURE 6. The flexible couplings or joints 32 and 33 are commercially available and are disclosed in Engineering Catalog 760, September 1962, of the Thomas Coupling Division Chain Belt Company, Warren, Pa., U.S.A., now the Thomas Coupling Division, Rex Chainbelt Inc. Other suitable types of joints can be used if desired, such as universal joints.

In use, the shaft 31 is driven by means of the motor 21 through the speed reducer 22 coupled to the shaft section 35. As the shaft 31 rotates, the scraper blades 53 scrape the inner surface of the heat exchange tube 24. Flowable materials can pass through the inlet conduit 55, into and through mixing space 38, and the mixed materials pass out through the outlet conduit 56. As the shaft 31 is relatively long and is unsupported throughout its length except at its ends, the shaft 31 is subject to deflection due to its own weight and the weight of the scraper blades 53 and mounts 54, any unbalanced forces exerted by materials being mixed, and any thermal stresses. The flexible joints 32 and 33 permit the shaft 31 to flex as the shaft 31 rotates. The absence of any bearing intermediate the ends of the shaft 31 facilitates assembly and disassembly of the shaft 31, obviates the need for any such bearing to be lubricated, eliminates any pressure drop due to the restriction to flow which such a bearing would cause, and prevents any solid particles from accumulating.

Referring now to the baffle structure 30 shown in detail in FIGURES 9 through 13 of the drawings. The baffle structure 30 is shown to include a pair of strips generally indicated at 80 and 81. The strips 80 and 81 include generally parallel cuts 82 which terminate short of one side edge 83 at respective enlarged holes 84. The cuts 82 are so narrow that they are merely slits in the strips 80 and 81. The cuts 82 form a marginal flange portion 85 and a series of baffle portions 86. The marginal flange portion 85 of the strip 81 is disposed in generally face-to-face relationship against the marginal flange portion 85 of the strip 80. The baffle portions 86 of the strip 87 lie alongside the baffle portions 86 of the strip 80. In particular, the baffle portions 86 are staggered with respect to the baffle portions 86 of the strip 80 in a spiral direction as seen for example in FIGURES 10 and 12. The strips 80 and 81 are joined to each other as for example by spot welds 87. The spot welds 87 join the marginal flange portions 85 of the strips 80 and 81 to each other at spaced apart locations. Connectors, in the form of tab-like elements 88, joined at spaced apart locations to the marginal flange portion 85 of the strip 81 as by spot welds 89, are each secured as by a spot weld 90 to the exterior of the heat exchange tube 24.

The strips 80 and 81 are formed of relatively thin flexible resilient metal such as stainless steel. The baffle portions 86 of the strips 80 and 81 are sufficiently long and extend obliquely with respect to the heat exchange tube 24 and the surrounding shell 23 to be flexed and urged into contact with both the heat exchange tube and the shell 23. Thus, the baffle portions 86 are slightly bent as best seen in FIGURE 13.

In making the heat exchange apparatus 20 of the invention, the strips 80 and 81 having generally parallel cuts 82 terminating short of one side edge 83 to form marginal flange portions 85 and a series of baffle portions 86 are provided. The baffle portions 86 are disposed obliquely with respect to respective marginal flange portions of the strips 80 and 81 are placed in face-to-face relationship with respect to each other so the baffle portions 86 of the strip 81 lie alongside the baffle portions of the second strip 80. Thereafter, the strips 80 and 81 are joined to each other, and the joined strips 80 and 81 are wrapped spirally about the heat exchange tube 24, and the joined strips 80 and 81 are secured to the heat exchange tube 24. Thereafter, the tube 24 and its strips 80 and 81 are slid into the shell 23, or the shell 23 is slid over the tube 24 and its strips 80 and 81.

The baffle means 30 provides a spiral path or channel in the space 27 through which the heat exchange medium can pass. As there is a relatively close fit between the ends of baffle portions 86 and the inner surface of the shell 23 and as the baffle portions 86 of one strip 80 are offset or staggered in the spiral direction with respect to baffle portions of the strip 81, leakage between baffle portions 86 of adjacent strips is minimal. If rigid baffles were employed instead, a certain amount of clearance between the baffle means and the inside of the surrounding shell would be required. This would cause leakage or short circuiting of the heat exchange medium, thereby reducing the heat transfer efficiency. In heat exchange apparatus 20 wherein the tube 24 and shell 23 are quite long in relation to their diameters, any such clearance which would be required if the baffle means were to be rigid would thus present a definite disadvantage.

Other embodiments and modifications of this invention will suggest themselves to those skilled in the art, and all such of these as come within the spirit of this invention are included within its scope as best defined by the appended claims.

I claim:

1. In a heat exchange apparatus: an elongate heat exchange tube adapted to contain flowable materials, an elongate shell spaced about said tube forming a path along which heat exchange medium can pass in heat exchange relationship with said tube, and baffle means disposed in a generally spiral arrangement between said tube and said shell so that the flowable heat exchange medium can pass in a spiral path, said baffle means including first and second strips each having generally parallel cuts terminating short of one side edge to form an elongated marginal flange portion and a series of baffle portions, said marginal flange portions of said first and second strips disposed in face-to-face relationship with respect to each other, said baffle portions of said first and second strips spanning the distance between said tube and said shell and lying alongside each other and said cuts forming V-shaped spaces between adjacent baffle portions with the baffle means spirally arranged about the tube, the openings being adapted for communication bteween adjacent portions of the spiral path.

2. In a heat exchange apparatus as claimed in claim 1, wherein said baffle portions of said first strip are staggered in a spiral direction with respect to said baffle portions of said second strip.

3. In a heat exchange apparatus as claimed in claim 1, including means for securing one of said marginal flange portions to said tube.

4. In a heat exchange apparatus as claimed in claim 1, wherein said first and second strips are formed of relatively thin resilient metal, said baffle portions being sufficiently long and extending obliquely with respect to said tube and said shell to be flexed and urged into contact with both said tube and said shell.

5. In a heat exchange apparatus as claimed in claim 1, wherein each cut is in the form of a slit terminating at an enlarged hole.

References Cited

UNITED STATES PATENTS

| 1,453,113 | 4/1923 | Hutchins | 165—89 X |
| 1,698,313 | 1/1929 | Luther | 165—89 X |
| 2,553,142 | 5/1951 | McCreary | 165—184 X |

MEYER PERLIN, *Primary Examiner.*

T. W. STREULE, *Assistant Examiner.*

U.S. Cl. X.R.
29—157.3; 165—184